(12) United States Patent
Yang et al.

(10) Patent No.: US 8,538,114 B2
(45) Date of Patent: Sep. 17, 2013

(54) METHOD AND SYSTEM UTILIZING PARAMETER-LESS FILTER FOR SUBSTANTIALLY REDUCING STREAK AND OR NOISE IN COMPUTER TOMOGRAPHY (CT) IMAGES

(75) Inventors: Zhi Yang, Vernon Hills, IL (US); Alexander Zamyatin, Hawthorn Woods, IL (US); Yu Zou, Naperville, IL (US); Michael D. Silver, Northbrook, IL (US)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 127 days.

(21) Appl. No.: 13/154,124

(22) Filed: Jun. 6, 2011

(65) Prior Publication Data

US 2012/0308104 A1 Dec. 6, 2012

(51) Int. Cl.
*G06K 9/00* (2006.01)
(52) U.S. Cl.
USPC .......................................................... 382/131
(58) Field of Classification Search
USPC ..... 382/128–134; 128/920–925; 356/39–49; 600/407–414, 424–426; 345/581–618
See application file for complete search history.

(56) References Cited

U.S. PATENT DOCUMENTS

| | | | |
|---|---|---|---|
| 7,558,362 B2 | 7/2009 | Shechter et al. | |
| 7,672,421 B2 | 3/2010 | Chen et al. | |
| 2003/0099405 A1 | 5/2003 | Avinash et al. | |
| 2005/0201605 A1 | 9/2005 | Li et al. | |
| 2010/0284626 A1 | 11/2010 | Malm et al. | |

FOREIGN PATENT DOCUMENTS

| | | |
|---|---|---|
| EP | 1383082 A2 | 1/2004 |
| WO | 2012056364 A1 | 5/2012 |

OTHER PUBLICATIONS

Deng, G. and Cahill, L.W., "An Adaptive Gaussian Filter for Noise Reduction and Edge Detection", IEEE, 1994, 0-7803-1487-5/94, pp. 1615-1619.
Hsieh, Jiang, "Adaptive streak artifact reduction in computed tomography resulting from excessive x-ray photon noise", Am. Assoc. Phys. Med., pp. 2139-2147, Med. Phys. 25, (11), Nov. 1998.
Gomez, Giovani, "Local Smoothness in Terms of Variance: The Adaptive Gaussian Filter", BMVC 2000, Bristol, UK, Sep. 11-14, 2000.
Kachelriess, Marc, Watzke, Oliver and Kalender, Willi A., "Generalized multi-dimensional adaptive filtering for conventional and spiral single-slice, multi-slice, and cone-beam CT", Med. Phys. 28 (4), Apr. 2001, Am. Assoc. Phys. Med., pp. 475-490.

(Continued)

*Primary Examiner* — Atiba O Fitzpatrick
(74) *Attorney, Agent, or Firm* — Yoshida & Associates, LLC

(57) ABSTRACT

Photon starvation causes streaks and noise and seriously impairs the diagnostic value of the CT imaging. To reduce streaks and noise, a new scheme of adaptive Gaussian filtering relies on the diffusion-derived scale-space concept in one embodiment of the current invention. In scale-space view, filtering by Gaussians of different sizes is similar to decompose the data into a sequence of scales. As the scale measure, the variance of the filter linearly relates to the noise standard deviation of a predetermined noise model in the new filtering method. The new filter has only one optional parameter that remains stable once tuned. Although single-pass processing using the new filter generally achieves desired results, iterations are optionally performed.

31 Claims, 11 Drawing Sheets

(56) References Cited

OTHER PUBLICATIONS

Thibault, Jean-Baptiste, Sauer, Ken D., Bouman, Charles A., and Hsieh, Jiang, "A three-dimensional statistical approach to improved quality for multislice helical CT", Med., Phys. 34 (11), Nov. 2007, 0094-2405/2007/34/(11)/4526/19, Am. Assoc. Phys Med., pp. 4526-4544.

Forthmann, Peter, Ziegler, Andy, Kohler, Thomas and Defrise, Michel, "PL Sinogram and ML Reconstruction—A Benchmark", 9th International Meeting on Fully Three-Dimensional Image Reconstruction in Radiology and Nuclear Medicine, (2007), pp. 378-381.

Manduca, Armando, Yu, Lifeng, Trzasko, Joshua D., Khaylova, Natalia, Kofler, James M., Mc Collough, Cynthia M., and Fletcher, Joel G., "Projection space denoising with bilateral filtering and CT noise modeling for dose reduction in CT", Med. Phys. 36 (11), Nov. 2009, Am. Assoc. Phys. Med, pp. 4911-4919.

Yu, Lifeng, Manduca, Armando, Jacobsen, Megan, Trzasko, Joshua D., Fletcher, Joel G., Delone, David R., James M., Mc Collough, Cynthia H., "Adaptive Modulation of Bilateral Filtering Based on a Practical Noise Model for Streaking and Noise Reduction in Multi-slice CT", Medical Imaging 2010: Physics of Medical Imaging, Proc. of SPIE vol. 7622, pp. 76222O1-76222O-7.

Extended Search Report Mailed by European Patent Office on Apr. 26, 2013 for Corresponding European Application No. 12171034.7.

METHOD AND SYSTEM UTILIZING PARAMETER-LESS FILTER FOR SUBSTANTIALLY REDUCING STREAK AND OR NOISE IN COMPUTER TOMOGRAPHY (CT) IMAGES

FIELD OF THE INVENTION

The current invention generally relates to an image processing method and system for substantially reducing streak and or noise in computer tomography images using a predetermined filter.

BACKGROUND OF THE INVENTION

Noise and streaks due to photon starvation can seriously corrupt the quality of X-ray CT images. Although an increased dose of X-ray may alleviate the problem, it is not clinically acceptable for patient safety. To achieve diagnostically useful image quality at a safe dosage level, prior art attempts have sought for decades a desirable solution for substantially reducing noise and streaks. With an elevated awareness of low doses, the above described research filed has recently gained great importance and received serious attention.

To improve results, prior efforts have utilized adaptive filters in lieu of fixed filters. Some examples of the fixed filters include a triangular filter and a bilateral filter. Similarly, some examples of the adaptive filters include an adaptive Gaussian filter and an adaptive trimmed mean filter. Among the prior art adaptive filters, the filter parameters still need to be adjusted for the same type or set of projection data, and the adjustment relies on an empirical and or ad hoc optimal. In another exemplary filter, the variance of a Gaussian filter kernel is the same as the noise variance of the data. Due to the ad hoc nature, the above described prior art adaptive filters insufficiently reduce noise and or streaks.

It remains desired to have an effective filter to maximize the noise and streak reduction while its filter parameters are not adjusted in a complex or ad hoc manner.

DETAILED DESCRIPTION OF THE PREFERRED EMBODIMENT(S)

Figure 1:
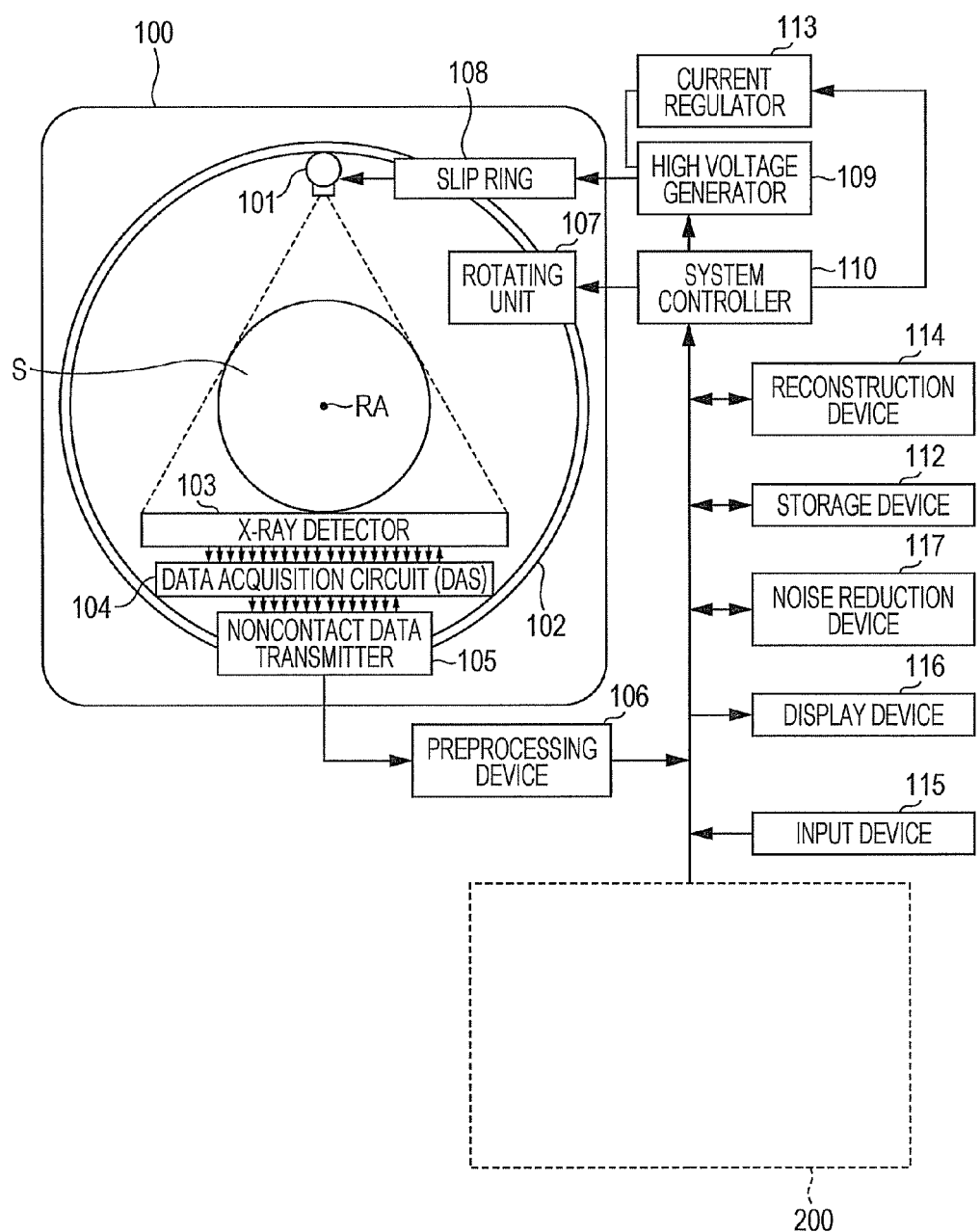
FIG. 1 is a diagram illustrating one embodiment of the multi-slice X-ray CT apparatus or scanner according to the current invention.

Referring now to the drawings, wherein like reference numerals designate corresponding structures throughout the views, and referring in particular to FIG. 1, a diagram illustrates one embodiment of the multi-slice X-ray CT apparatus or scanner according to the current invention including a gantry 100 and other devices or units. The gantry 100 is illustrated from a front view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which rotates around axis RA. A rotating unit 107 rotates the frame 102 at a high speed such as 0.4 sec/rotation while the subject S is being moved along the axis RA into or out of the illustrated page.

The multi-slice X-ray CT apparatus further includes a current regulator 113 and a high voltage generator 109 that applies a tube voltage to the X-ray tube 101 so that the X-ray tube 101 generates X ray. In one embodiment, the high voltage generator 109 is mounted on the frame 102. The X rays are emitted towards the subject S, whose cross sectional area is represented by a circle. The X-ray detector 103 is located at an opposite side from the X-ray tube 101 across the subject S for detecting the emitted X rays that have transmitted through the subject S.

Still referring to FIG. 1, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR).

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, a display device 116, an input device 115, and a scan plan support apparatus 200. The scan plan support apparatus 200 includes a function for supporting an imaging technician to develop a scan plan.

One embodiment of the current invention further includes various software modules and hardware components for substantially reducing streak and or noise in computer tomography images using a predetermined filter. According to one aspect of the current invention, a noise reduction device 117 of the CT apparatus advantageously performs the noise and or streak reduction. In one embodiment, the noise reduction device 117 is operationally connected to other software modules and or system components such as the storage device 112, the reconstruction device 114, the display device 116 and the input device 115 via a data/control bus. In this regard, the noise reduction device 117 alone does not necessarily perform noise reduction functions and or their associated tasks in other embodiments according to the current invention. Furthermore, the noise reduction device 117 is optionally a part of other devices such as the reconstruction device 114 in alternative embodiments according to the current invention.

In general, projection data in CT is available after a predetermined log-conversion process. The log-conversion process converts measured X-ray intensity signals that have been attenuated by a scanned object into line integral data. Subsequently, CT images are reconstructed from the line integral data by known methods of mathematical inversion. In one exemplary embodiment of the noise/streak reduction system according to the current invention, the noise reduction device 117 converts the projection data back into original x-ray intensity data or photon count measurements. In this case, the noise reduction device 117 needs some information on the system calibration process in the conversion step. Alternatively, the noise reduction device 117 has a direct access to the measured X-ray intensity signals.

The noise reduction device 117 determines noise variance (V) of the after-log data based upon the X-ray intensity signals or photon counts. The noise variance is computed such that the noise will be equalized after the log-conversion process.

To understand the effect of logarithmic conversion on the measured data, the noise model is examined with respect to variance before and after the log conversion. Before-log noise variance $Var_{BL}$ is estimated by a before-log noise model as defined in Equation (1):

$$Var_{BL} = V_e + WI \quad (1)$$

where $Var_{BL}$ is the total before-log noise variance, $V_e$ is the electronic noise variance, and I is the mean count. W is the detector gain that is function of channels, segments, a data acquisition system (DAS) and or collimation. On the other hand, after-log noise variance $Var_{AL}$ is estimated by an after-log noise model as defined in Equation (2):

$$Var_{AL} = \frac{Var_{BL}}{I^2} \quad (2)$$

Both of the above equations are disclosed in "Adaptive streak artifact reduction in CT resulting from excessive x-ray photon noise", Jiang Hsieh (GE), *Med. Phys.* 25 (11), 2139-47, 1998.

After the noise variance has been determined, an adaptive Gaussian Filterer is applied to the x-ray intensity data. One exemplary form of the adaptive Gaussian filter (G) is defined by Equation (3):

$$G_\sigma = \frac{1}{\sqrt{2\pi}\sigma_G} \exp\left(-\frac{x^2}{2\sigma_G^2}\right) \quad (3)$$

where the standard deviation (SD) $\sigma_G$ determines the effective filter kernel size, and x is the distance between an arbitrary position and the center position in the kernel. A key to the successful application of an adaptive Gaussian filtering is to determine a value of the noise SD $\sigma_G$ as a function of the local characteristics of the data or the noise. In the embodiments of the noise and or streak reduction device according to the current invention, the variance $V_G$ (or $\sigma_G^2$) of the filter kernel is adaptively determined as a function $f$ of the noise variance $Var_{AL}$ as defined in Equation (4):

$$V_G = f(Var_{AL}) \quad (4)$$

The above general equation will be further explained with respect to a particular implementation of the noise and or streak reduction device according to the current invention. Although one exemplary function in Equation (4) is defined in the following in Equation (5), this example is not limiting other implementations according to the current invention.

$$V_G = K(Var_{AL})^P \quad (5)$$

where K is a parameter for controlling filtering strength. In one embodiment, K is set to 1. In other embodiments, the parameter K depends on a type of application, and the parameter K value is optionally orders of magnitude. Furthermore, another parameter P is the power or exponent parameter whose typical range encompasses between 0 and 2. In one embodiment, the exponent P value is 0.5. Other P values such as P=1 are also optionally utilized in other embodiments for suitable applications.

Figure 2:
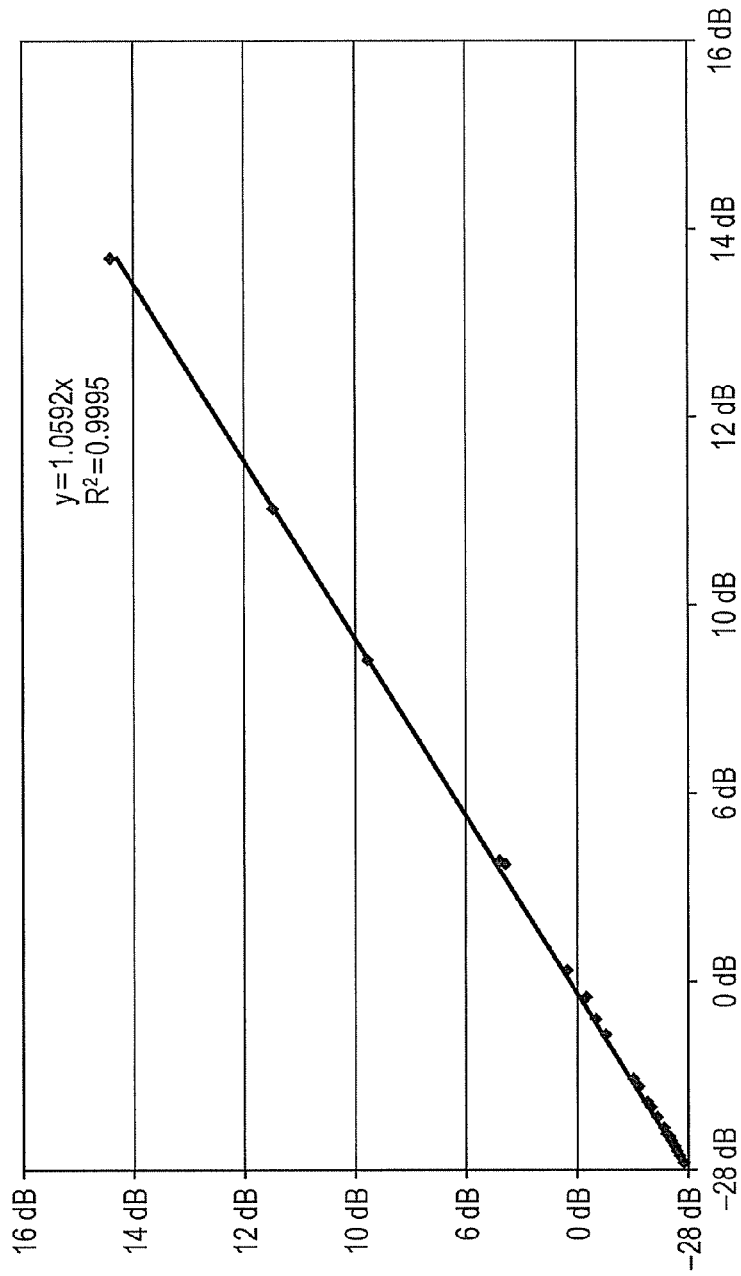
FIG. 2 is a graph illustrating a relationship between the variance predicted by the noise model (y-axis) and real measured variance (x-axis).
Figure 3:
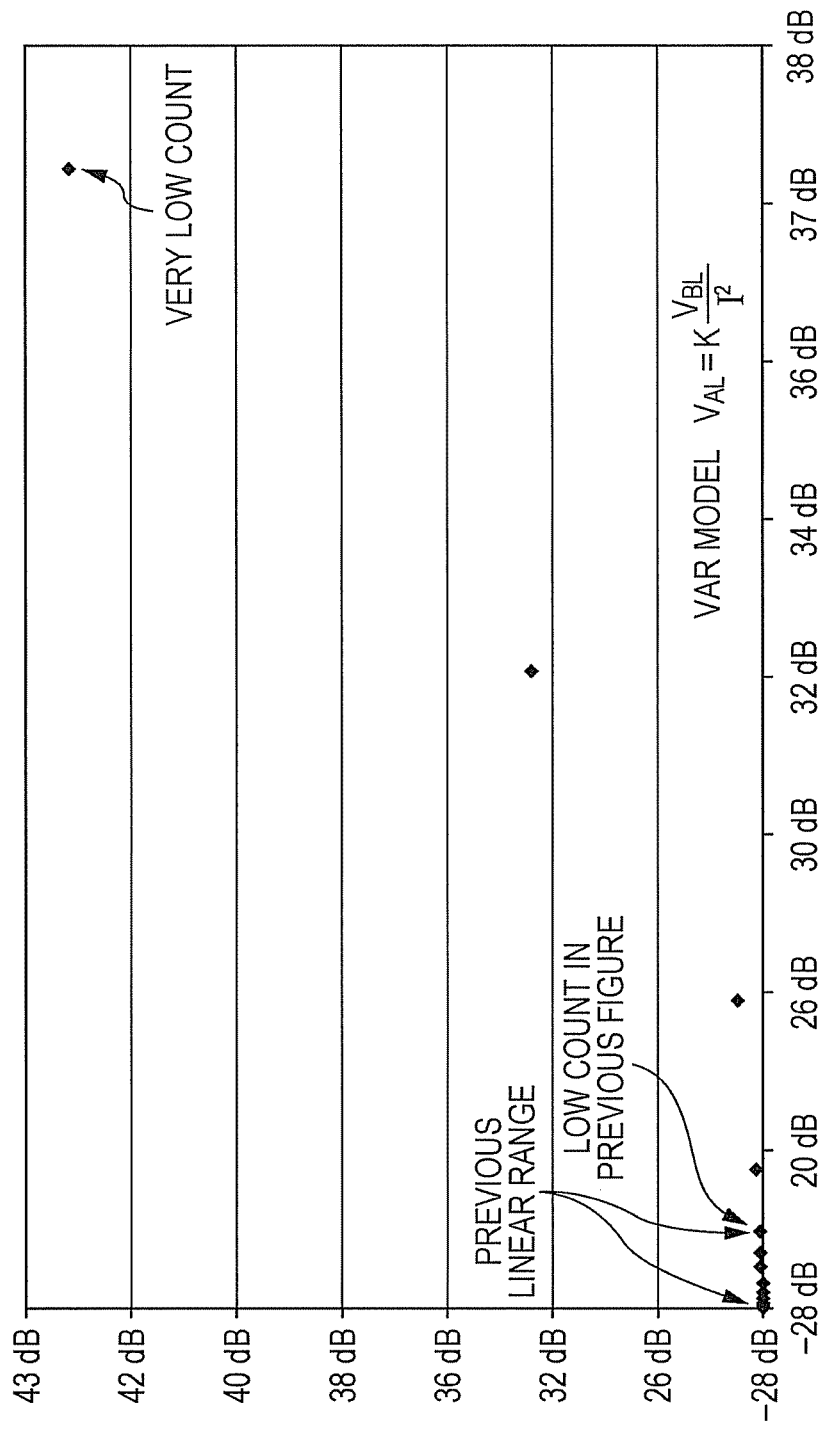
FIG. 3 is a graph illustrating a relationship between the variance predicted by the noise model (y-axis) and real measured variance (x-axis) in counts range of FIG. 2 and an extended low count range where the relationship becomes highly non-linear.

FIG. 2 illustrates a relation between photon counts and measured variance with respect to the after-log noise model of Equation (2). The after-log noise model as indicated by the line closely describes true after-log variance values for counts 44 and higher (note that Ve~30-40). On the other hand, as illustrated in FIG. 3, when counts become low below 44 (i.e., falling onto the electronic noise floor), the measured variance becomes highly non-linear with respect to the after-log noise model. That is, the after-log noise model is not accurate for the low counts. Since the variance becomes huge at low counts, it is necessary to reduce variance at low counts if the after-log data is to be used for the noise variance determination. The variance is shown in relative variance values as expressed in decibel (dB) based upon an arbitrary selected large value.

In embodiments of the noise and or streak reduction device according to the current invention, the noise variance is estimated based upon projection data after the log-conversion, and a filter is constructed based upon the after-log variance. Subsequently, the above described filter is applied to the measured data or X-ray intensity data before the log-conversion. Lastly, the above described filtered x-ray intensity data are converted back to projection data (i.e., line integral) domain before CT images are reconstructed according to the current invention. For this reason, the following exemplary filter construction method is illustrated using a Gaussian filter.

In the first filter construction method, suppose that noise at count $I_0$ is acceptable, the desired variance level $Var_0$ is defined by Equation (6):

$$Var_0 = (Ve_0 + W_0 I_0)/I_0^2 \quad (6)$$

where $Ve_0$ and $W_0$ are respectively a mean value of the electronic noise variance and the detector gain.

Furthermore, variance is reduced by low-pass filtering. That is, variance after log $Var_{AL}$ is reduced by a certain ratio VRR to a filtered variance $Var_F$ as defined in Equation (7)

$$Var_F = Var_{AL} VRR \qquad (7)$$

where a desired reduction ratio VRR is determined by Equation (8) when the filtered variance $Var_F$ is equal to or smaller than the desired variance level $Var_0 (Var_F \leq Var_0)$:

$$VRR = Var_0 / Var_{AL} = Var_0 I^2 / Var_{BL} \qquad (8)$$

where $Var_{BL}$ is the total before-log noise variance while $Var_{AL}$ is the total after-log noise variance, and I is the mean count.

Suppose the above low-pass filter is given by a predetermined set of coefficients $\{c_k\}$, where k=1 ... N, $c_k > 0$, and $\Sigma_k c_k = 1$. With respect to the above described coefficients, the desired reduction ratio VRR is defined by Equation (9):

$$VRR = \Sigma_k c_k^2. \qquad (9)$$

Furthermore, the coefficients $\{c_k\}$ are optionally a N-dimensional Gaussian filter with its filter variance $V_G$ as defined by Equation (10):

$$\Sigma_k c_k^2 = 1/(4\pi V_G)^{N/2}. \qquad (10)$$

From Equations (8) through (10), the variance of the Gaussian filter $V_G$ is estimated by Equations (11A) and (11B) for a dimension N.

$$1/(4\pi V_G)^{N/2} = Var_0 I^2 / Var_{BL} \qquad (11A)$$

$$V_G = 1/(4\pi)(Var_{BL}/(Var_0 Mean^2))^{2/N} \qquad (11B)$$

Based upon Equation (11B), the variance of the Gaussian filter $V_G$ is simplified as expressed in Equation (11C) with two variables VarScale and VarPower. In fact, Equation (11c) is tantamount to Equation (5), where the parameters K and P of Equation (5) respectively correspond to VarScale and VarPower of Equation (11C). In the current application, the parameters K and P of Equation (5) and VarScale and VarPower of Equation (11C) are interchangeable. According to the first filter construction method, Equation (11C) defines the variance of the Gaussian filter $V_G$:

$$V_G = VarScale\ Var_{AL}^{VarPower} \qquad (11C)$$

Where $Var_{AL}$ is already defined by Equation (2). Finally, the variance of the Gauss filter $V_G$ is determined from the after-log noise variance $Var_{AL}$ with the two variables VarScale and VarPower. The variable VarScale is also defined by Equation (12) with respect to the previously defined $Var_0$ from Equation (6). According to the first filter construction method, Equation (12) defines the variable VarScale:

$$VarScale = 1/(4\pi)(1/Var_0)^{2/N} \qquad (12)$$

On the other hand, the other variable VarPower is defined in Equation (13), and the value is easily determined for 2D, 3D and 4D filters in embodiments of the noise and or streak reduction device according to the current invention. According to the first filter construction method, Equation (13) defines the variable VarPower:

$$VarPower = 2/N \qquad (13)$$

Figure 4:
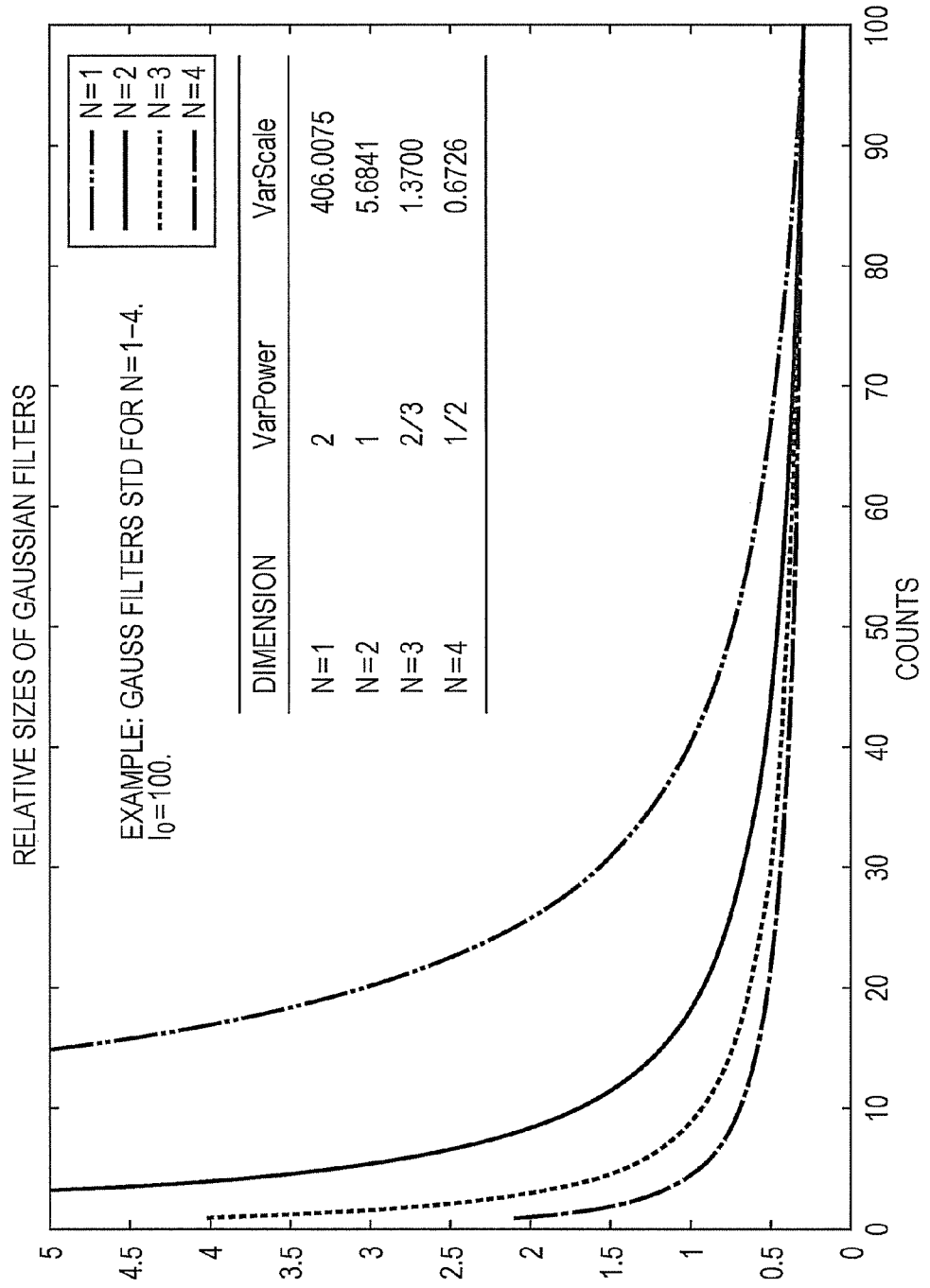
FIG. 4 is a graph illustrating a relationship between the effective filter size of the Gauss filter and the count with respect to the dimension N, VarScale and VarPower using a predetermined Gaussian filter.

=1 for 2D Gaussian filters
=2/3=0.67 for 3D Gaussian filters
=1/2 for 4D Gaussian filters Now referring to FIG. 4, a graph illustrates a relationship between the effective filter size of the Gauss filter and the count with respect to the dimension N, VarScale and VarPower using a predetermined Gaussian filter. With a particular value of the dimension N, ranging from 1 through 4, the VarPower value ranges from 2 to 0.5. On the other hand, the VarScale values have a wider range from 406.0075 to 0.6726. As shown, at N=4, the variance is constant over the widest range of the counts. On the other hand, at N=1, the variance is constant over the narrowest range of the counts. The ranges of VarPower and VarScale are not limited to the above disclosed value ranges in other embodiments in order to practice the current invention. In fact, VarPower optionally ranges from 1 to 10000 while VarPower optionally ranges from 0.2 to 1 according to certain other aspects of the invention.

As described above, in embodiments of the noise and or streak reduction device according to the current invention, the noise variance is estimated based upon projection data after the log-conversion, and a filter is constructed based upon the after-log variance. Subsequently, the above described filter is applied to the measured data or X-ray intensity data before the log-conversion. Lastly, the above described filtered x-ray intensity data are converted back to projection data (i.e., line integral) domain before CT images are reconstructed according to the current invention. As a result of the above described filter application, the log converted projection data has substantially uniform variance.

In general, total variance in measured data depends upon both Poissonian and Gaussian noise. Although the count data from detector is ideally of Poissonian distribution, the actual data is compounded with Gaussian distributed electronic noise that is induced in the data acquisition system (DAS) circuitry. In reconstructed images, since the low count data produces the streaks and intolerable noise, electronic noise is no longer negligible at low counts. Thus, an accurate noise model should take both Poissonian and Gaussian noise into account.

Equations (11A), (11B) and (11C) assume infinite Gaussian kernel. In practice, the Gaussian kernel is limited to a definite mask such as 5×7. For further implementation of the noise and or streak reduction device such as the noise reduction device 117, Equation (14) defines one way to determine discrete Gaussian filtering for each of the measured data values. That is, the discrete kernel of the filter for a particular detector element (i) is defined by:

$$I_{i_0}^G = \frac{\sum_i I_i \exp\left(-\frac{\Delta x_i^2}{2V_{i_0}}\right) \exp\left(-\frac{(I_{i_0} - I_i)^2}{2V_R}\right)}{\sum_i \exp\left(-\frac{\Delta x_i^2}{2V_{i_0}}\right) \exp\left(-\frac{(I_{i_0} - I_i)^2}{2V_R}\right)} \qquad (14)$$

where $\Delta x_i$ is the distance of a $i^{th}$ pixel in a one dimensional (1D) detector to a predetermined reference pixel $i_0$ and $Vi_0$ is the frequency response of the filter at the reference pixel $i_0$. $V_R$ is a parameter of the filter.

By the same token, the noise reduction device 117 determines discrete Gaussian filtering for each of the measured data values in a two dimensional (2D) detector. That is, the discrete kernel of the filter for a particular detector element (i,j) is defined by Equation (15):

$$I_{(i_0, j_0)}^G = \frac{\sum_{i,j} I_{i,j} \exp\left(-\frac{\Delta x_{i,j}^2}{2V_{i_0, j_0}}\right) \exp\left(-\frac{(I_{i_0, j_0} - I_{i,j})^2}{2V_R}\right)}{\sum_{i,j} \exp\left(-\frac{\Delta x_{i,j}^2}{2V_{i_0, j_0}}\right) \exp\left(-\frac{(I_{i_0, j_0} - I_{i,j})^2}{2V_R}\right)} \qquad (15)$$

where $\Delta x_{i,j}$ the distance of a ($i^{th}$, $j^{th}$) pixel in a 2D detector to a predetermined reference pixel ($i_0$, $j_0$) and $Vi_0$, $j_0$ is the frequency response of the filter at the reference pixel ($i_0$, $j_0$). $V_R$ is a parameter of the filter.

Contrary to prior art attempts, the embodiments of the noise and or streak reduction device according to the current invention estimate the noise variance based upon the noise characteristics of projection data after the log-conversion, and a filter is constructed based upon the after-log estimated variance. Subsequently, the above described filter is applied to the original measured data or X-ray intensity data before the log-conversion. Lastly, the above described filtered x-ray intensity data are converted back to projection data (i.e., line integral) domain before CT images are reconstructed according to the current invention.

In certain embodiments, the above described steps of substantially minimizing the noise and or streak are optionally iterated for several times to achieve a desirable noise reduction effect. In these embodiments, the parameters p and K optionally vary for desired solutions. Furthermore, the parameters p and K optionally vary for each instance of iteration.

To determine clinically useful values of the parameters K and P of Equation (5) or VarScale and VarPower of Equation (11C) in the above described noise and or streak reduction process, an optimal noise filter is constructed as iterative reconstruction (IR) noise model filtering. In general, the role of pure raw data filtering is to remove the effect of electronic noise or photon starvation. Logarithmic conversion results in unreliable raw data at low values, so lower statistical weight are assigned to these data. Thus, the pure raw data filtering and the statistical weight complement each other. For these reasons, the embodiments of the noise and or streak reduction device according to the current invention do not require strong data filtering such as image regularization based upon total variation (TV) or Adaptive Weighted Anisotropic Diffusion (AWAD). In summary, the IR noise model filtering improves to preserve the spatial resolution for low dose data by using weak filtering parameters.

Figure 5:
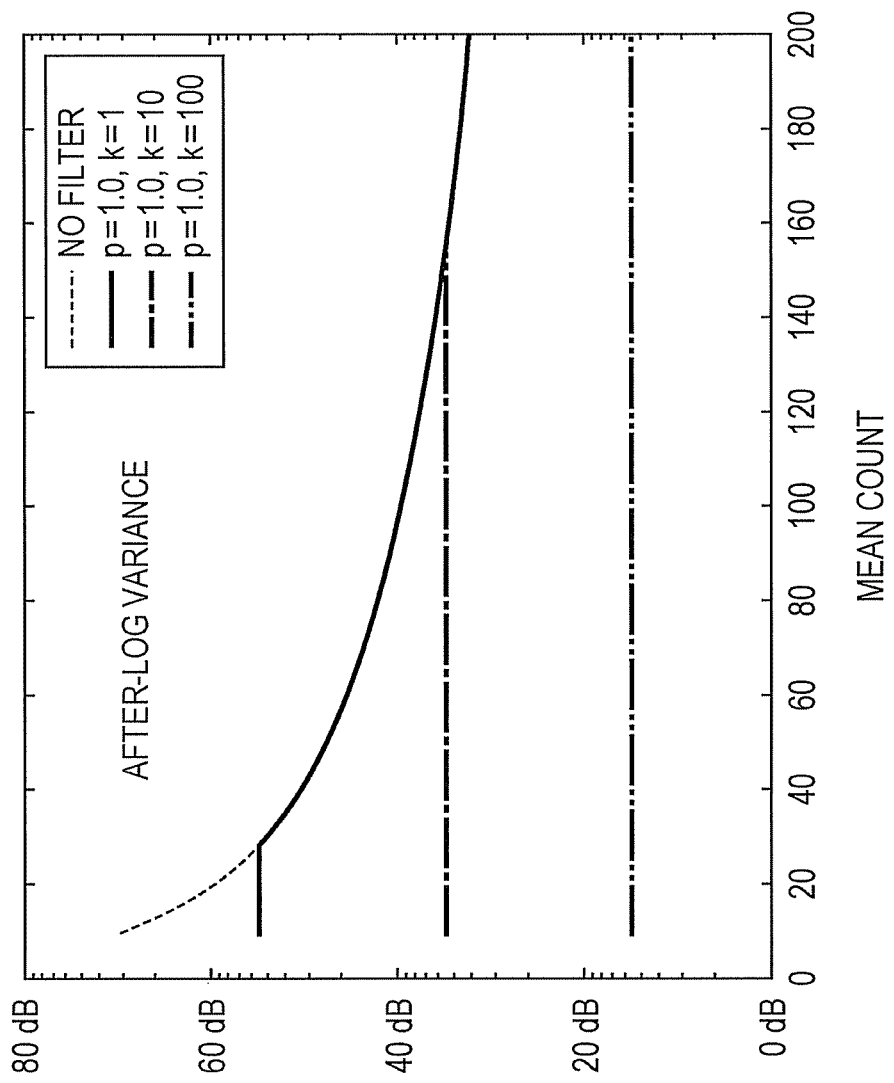
FIG. 5 is a graph illustrating a relation between the mean count and the after-log variance after filtering in an embodiment of the noise and or streak reduction device using a predetermined filter with a first set of parameter values according to the current invention.

Other variations in the parameters are illustrated in the following examples. Now referring to FIG. 5, a graph illustrates a relation between the mean count and the after-log variance in an embodiment of the noise and or streak reduction device using a predetermined filter according to the current invention. Assuming infinite Gaussian kernel, the parameter K of Equation (5) or VarScale of Equation (11C) has been adjusted at 1, 10 and 100 while the parameters P of Equation (5) or VarPower of Equation (11C) is fixed at 1. Without any filter, there appears to be no noise-equalizing in the after-log variance across the mean count. At k=1, there appears to be some noise-equalizing effect in the after-log variance in a small low mean count region below 30. At k=10, there appears to be significant noise-equalizing effect in the after-log variance over a wide mean count region below 160. Lastly, k=100, there appears to be noise-significant equalizing effect in the after-log variance over all mean count regions below 200. The variance is shown in relative variance values as expressed in decibel (dB) based upon an arbitrary selected large value.

Figure 6:
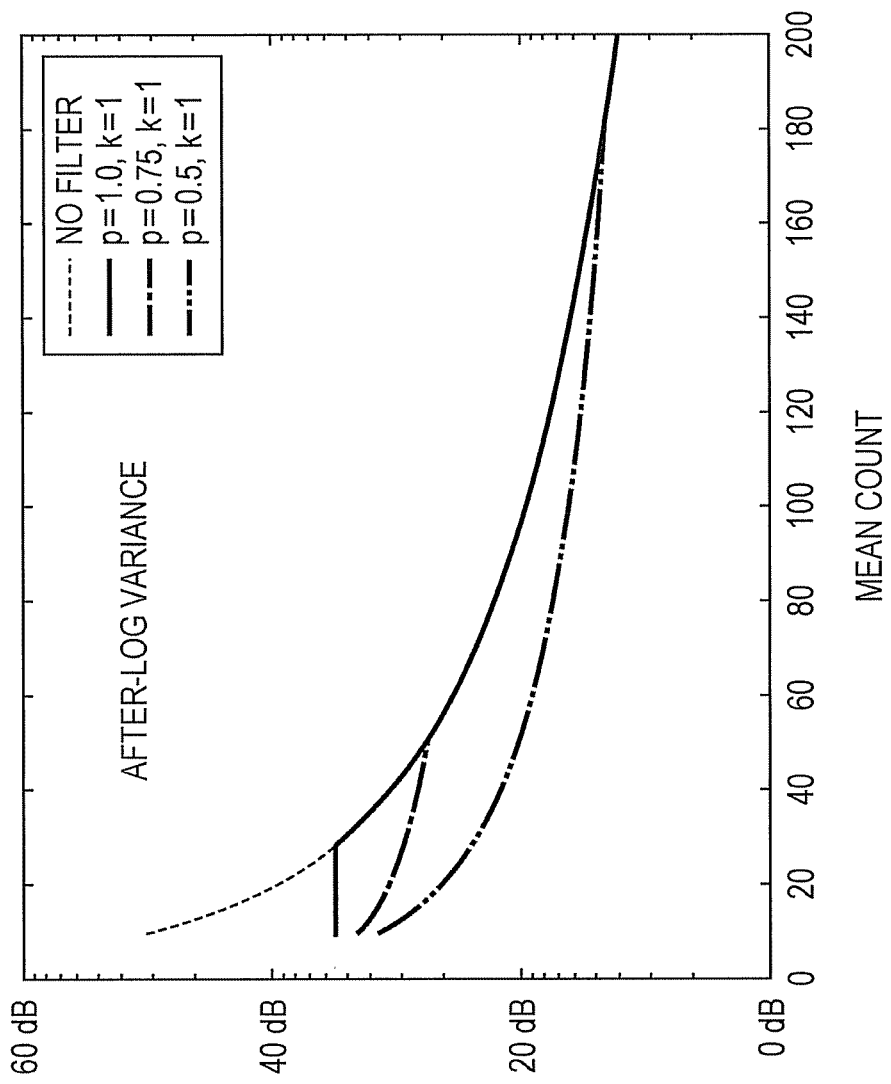
FIG. 6 is a graph illustrating a relation between the mean count and the after-log variance after filtering in an embodiment of the noise and or streak reduction device using a predetermined filter with a second set of parameter values according to the current invention.

Now referring to FIG. 6, a graph illustrates a relation between the mean count and the after-log variance in an embodiment of the noise and or streak reduction device using a predetermined filter according to the current invention. Assuming infinite Gaussian kernel, the parameter the parameters P of Equation (5) or VarPower of Equation (11C) has been adjusted at 1, 0.75 and 0.5 while the parameter K of Equation (5) or VarScale of Equation (11C) is fixed at 1. Without any filter, there appears to be no noise-equalizing in the after-log variance across the mean count. At P=1, there appears to be some noise-equalizing effect in the after-log variance in a small low mean count region below 30. At P=0.75, although there appears to be also some noise-equalizing effect in the after-log variance over a slightly wider mean count region below 50, the equalizing effect is not achieving a completely flat equalized region. Lastly, P=0.5, there appears to be significant noise-equalizing effect in the after-log variance over substantially wider mean count regions below 200. The noise-equalizing effect appears to be significant between the mean count between 60 and 200. The variance is shown in relative variance values as expressed in decibel (dB) based upon an arbitrary selected large value.

Figure 7:
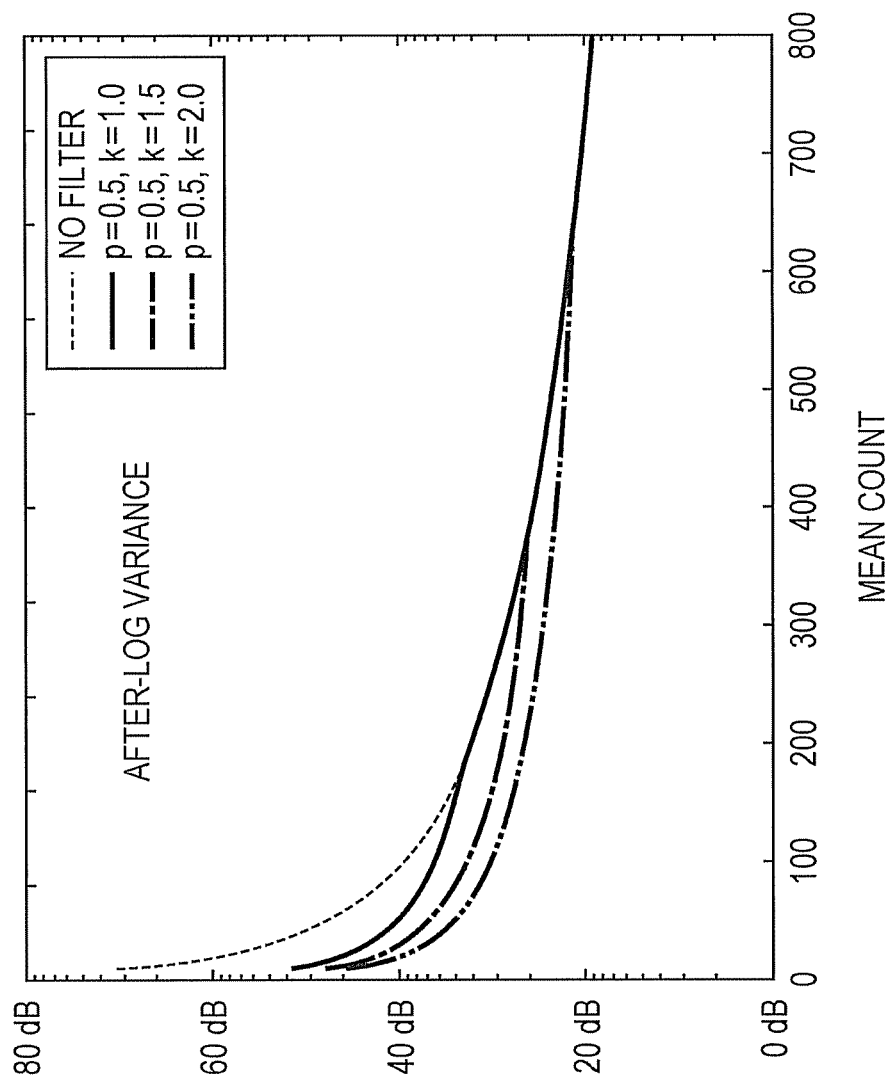
FIG. 7 is a graph illustrating a relation between the mean count and the after-log variance after filtering in an embodiment of the noise and or streak reduction device using a predetermined filter with a third set of parameter values according to the current invention.

Now referring to FIG. 7, a graph illustrates a relation between the mean count and the after-log variance in an embodiment of the noise and or streak reduction device using a predetermined filter according to the current invention. Assuming infinite Gaussian kernel, the parameter K of Equation (5) or VarScale of Equation (11C) has been adjusted at 1, 1.5 and 2 while the parameters P of Equation (4) or VarPower of Equation (11C) is fixed at 0.5. Without any filter, there appears to be no noise-equalizing in the after-log variance across the mean count. At K=1, there appears to be some noise-equalizing effect in the after-log variance in a small low mean count region below 180. At K=1.5, there appears to be some noise-equalizing effect in the after-log variance over a slightly wider mean count region below 380. Lastly, K=2.0, there appears to be noise-equalizing effect in the after-log variance over a wider count region below 800. The variance is shown in relative variance values as expressed in decibel (dB) based upon an arbitrary selected large value.

Figure 8:
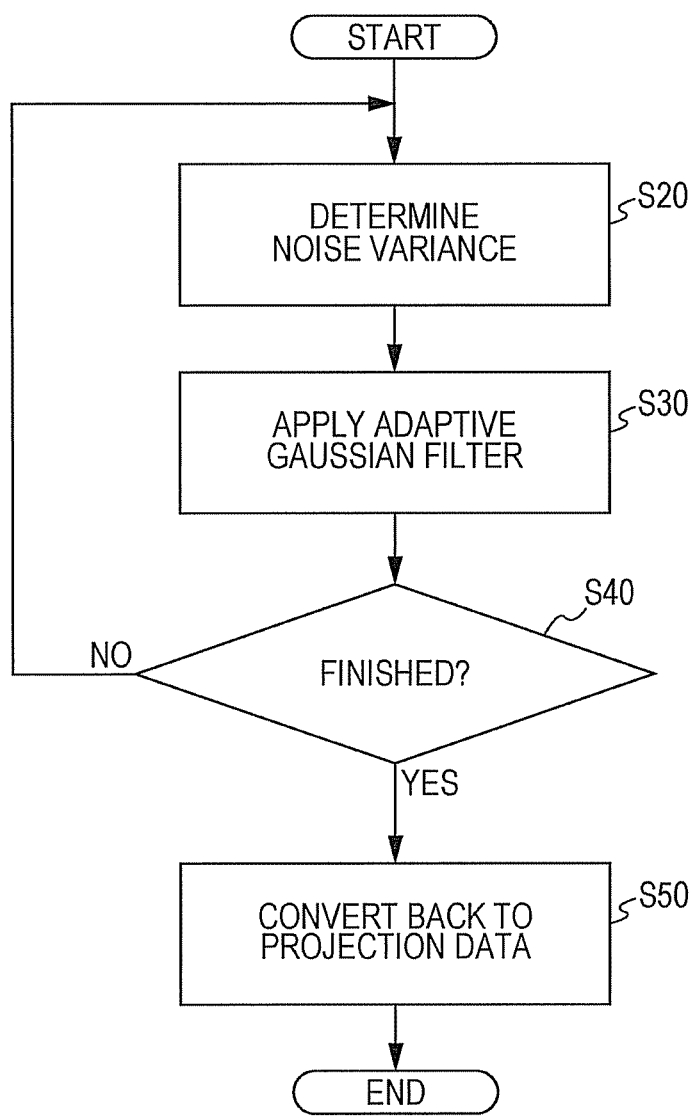
FIG. 8 is a flow chart illustrating steps involved in one exemplary process of substantially reducing noise and or streaks in measured data before reconstructing CT images according to the current invention.

Now referring to FIG. 8, a flow chart illustrates steps involved in one exemplary process of substantially reducing noise and or streaks in measured data before reconstructing CT images according to the current invention. In general, projection data in CT is available after a predetermined log-conversion process. The log-conversion process converts measured X-ray intensity signals that have been attenuated by a scanned object into line integral data. Subsequently, CT images are reconstructed from the line integral data by known methods of mathematical inversion.

In one exemplary embodiment of the noise/streak reduction process according to the current invention, the following steps are performed by a predetermined combination of software and hardware. Implementation of the process is not limited to any particular software or hardware modules.

The noise reduction process determines noise variance (V) of the measurement data based upon the X-ray intensity signals or photon counts in a step S20. The noise variance s computed such that the noise will be equalized after the log-conversion process. The after-log noise variance $Var_{AL}$ is determined by the noise model as defined in above Equation (2), which takes the measured x-ray intensity or photon count I and the electronic noise Ve such as a data acquisition system into account based upon Equation (1).

After the after-log noise variance $Var_{AL}$ has been determined in the step S20, an adaptive Gaussian Filterer is applied in a step S30 to the x-ray intensity data from the step S10. One exemplary form of the adaptive Gaussian filter (G) is defined by above Equation (3). The adaptive Gaussian filter relies on the standard deviation σ to determine the effective filter kernel size and the distance x between an arbitrary position and the center position in the kernel. An adaptive Gaussian filtering is successfully applied to a value of the noise SD σ as a function of the local characteristics of the data or the noise. In the exemplary process of substantially reducing noise and or streaks according to the current invention, the variance $V_G$ (or $\sigma_G^2$) of the filter kernel is adaptively determined as a function $f$ of the noise variance V as defined in above Equation (4). A particular implementation of the noise and or streak reduction process involves a parameter K for controlling filtering strength. In one embodiment, K is set to 1. In other embodiments, the parameter K depends on a type of application, and the parameter K value is optionally orders of magnitude. Furthermore, the particular implementation of the noise and or streak reduction process also involves a second parameter P, which is the power or exponent parameter whose typical range encompasses between 0 and 2. In one process, the exponent P value is 0.5. Other p values such as P=1 are also optionally utilized in other processes for suitable applications. The above described parameters K and P are respectively interchangeable with VarScale and VarPower of above Equation (11c) in the exemplary process of substantially reducing noise and streaks according to the current invention.

In further implementation detail of the step S30, one way to determine discrete Gaussian filtering for each of the measured data values is defined for a particular one dimensional (1D) detector element (i) by above Equation (14). Similarly, one way to determine discrete Gaussian filtering for each of the measured data values is defined for a particular two dimensional (2D) detector element (i, j) by above Equation (15). The discrete Gaussian filter kernel is constructed and applied to each of the measured data within the step S30. Contrary to prior art attempts, the above described exemplary process of substantially reducing the noise and or streaks according to the current invention estimates the noise variance based upon the noise characteristics of projection data after the log-conversion, and a filter is constructed based upon the after-log estimated variance in the steps S20. Subsequently, the above described filter is applied in the step S30 to the original measured data or X-ray intensity data before the log-conversion.

Optionally, the steps S20 and S30 are iteratively repeated in certain applications in the exemplary process according to the current invention. To be optionally iterated, a step S40 determines whether or not that the exemplary process proceeds back to the step S20. If the step S40 determines that the filter is to be iteratively applied, the exemplary process repeats from the step S20. On the other hand, if the step S40 determines that the filter is not iteratively applied or the iteration has completed, the exemplary process goes a step S50. Lastly, in the step S50, the above described filtered x-ray intensity data are converted back to projection data (i.e., line integral) domain before CT images are reconstructed according to the current invention.

Figure 9A:
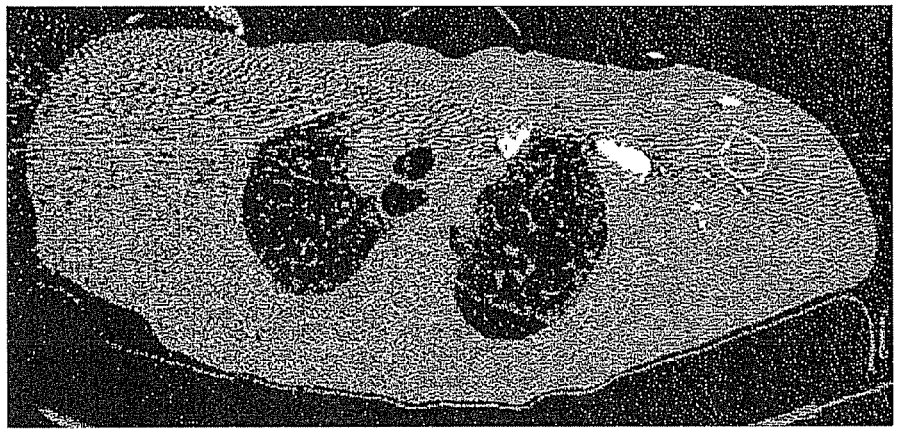
FIGS. 9A, 9B and 9C are shoulder images illustrating clinically meaningful improvement as a result of the adaptive Gaussian filter application according to the current invention.
Figure 9B:
Figure 9C:
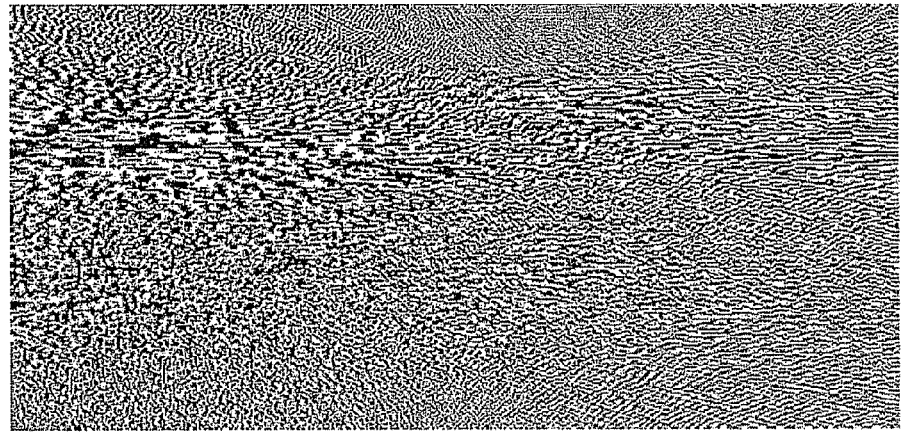

Now referring to FIGS. 9A, 9B and 9C, shoulder images illustrate clinically meaningful improvement as a result of the adaptive Gaussian filter application according to the current invention. The variance of DAS electronic noise, Ve is determined from real scan data which was acquired without turning the X-ray tube. The only filter parameter is K, which was set to 1 in all testing cases of FIGS. 9A, 9B and 9C. Furthermore, the images as shown in FIGS. 9A, 9B and 9C were acquired with 160-row detector at 120 kv and 195 mAs with +69.5 mm/rotation couch speed. FIG. 9A shows the reconstructed image without data domain filtering by the adaptive Gaussian filter according to the current invention. FIG. 9B shows the reconstructed image with data domain filtering by the adaptive Gaussian filter according to the current invention. FIG. 9B shows that the streaks and noise have been substantially suppressed by the adaptive Gaussian filter according to the current invention. In other words, the streaks and noise have obstructed and or obscured clinically relevant information in FIG. 9A. On the other hand, FIG. 9B delineates the above clinically relevant information. Lastly, FIG. 9C illustrates the difference image that shows almost no loss of structural information.

Figure 10A:
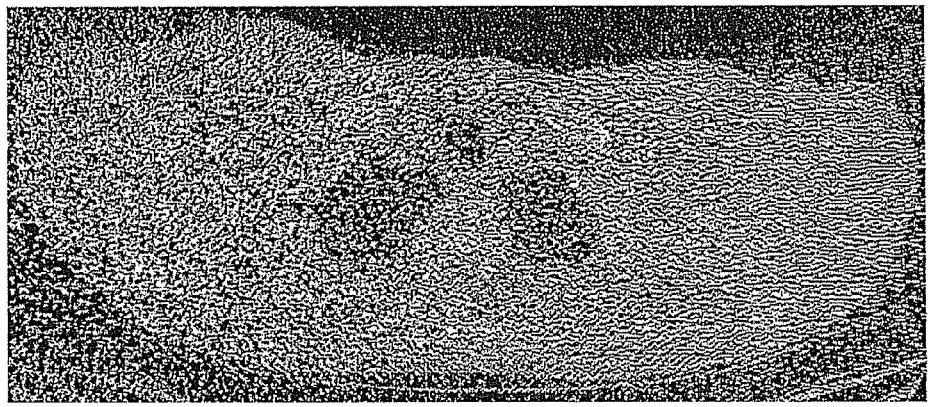
FIGS. 10A, 10B and 10C are other shoulder images illustrating clinically meaningful improvement as a result of the adaptive Gaussian filter application according to the current invention.
Figure 10B:
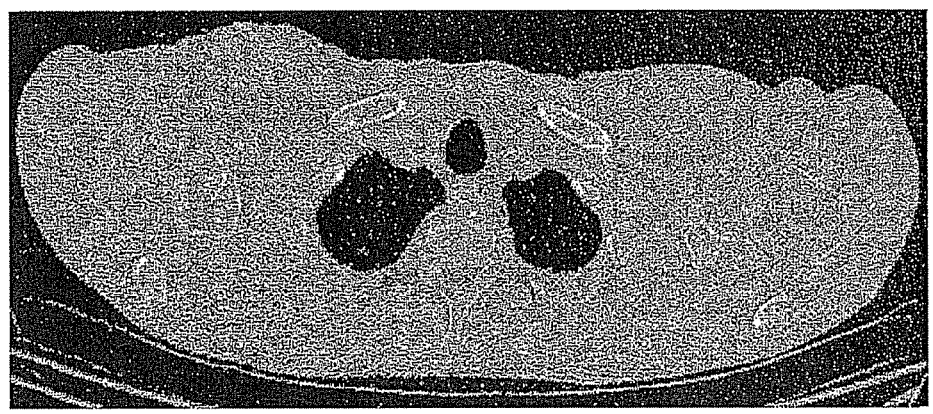
Figure 10C:
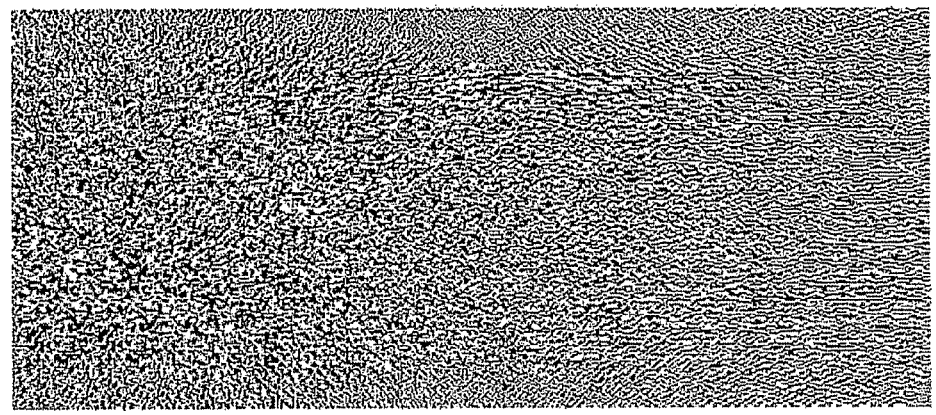

Now referring to FIGS. 10A, 10B and 10C, other shoulder images illustrate clinically meaningful improvement as a result of the adaptive Gaussian filter application according to the current invention. The improved quality is almost consistent in all cases. The variance of DAS electronic noise, Ve is determined from real scan data which was acquired without turning the X-ray tube. The only filter parameter is K, which was set to 1 in all testing cases of 10A, 10B and 10C. Furthermore, the images were acquired with 64-row detector at 120 kv and 30 mAs with +47.5 mm/rotation couch speed. FIG. 10A shows the reconstructed image without data domain filtering by the adaptive Gaussian filter according to the current invention. FIG. 10B shows the reconstructed image with data domain filtering by the adaptive Gaussian filter according to the current invention. FIG. 10B shows that the streaks and noise have been substantially suppressed by the adaptive Gaussian filter according to the current invention. In other words, the streaks and noise have obstructed and or obscured clinically relevant information in FIG. 10A. On the other hand, FIG. 10B delineates the above clinically relevant information. Lastly, FIG. 10C illustrates the difference image that shows almost no loss of structural information.

Figure 11A:
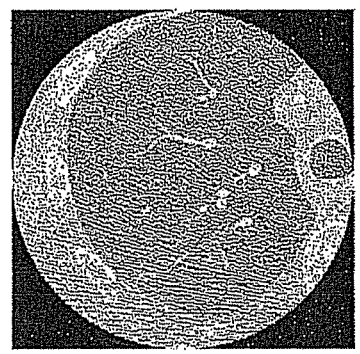
FIGS. 11A, 11B and 11C are images of zoomed reconstructions based upon the same data of FIGS. 10A, 10B and 10C, but they are viewed at the lung window.
Figure 11B:
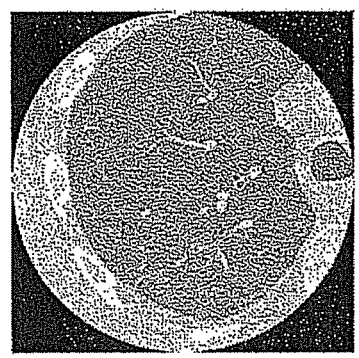
Figure 11C:
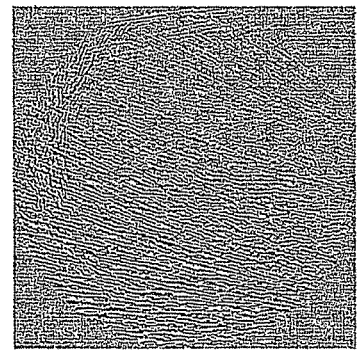

Now referring to FIGS. 11A, 11B and 11C, images are zoomed reconstructions based upon the same data of FIGS. 10A, 10B and 10C, but they are viewed at the lung window. As clearly seen, the streaks have been substantially removed in FIG. 11B without apparent resolution degradation in the lung tissue. Although a cloud-like smear is clearly observed in a lower lung region in FIG. 11B, it is ambiguous in FIG. 11A. Some blooming effect is observed in the ribs. This may be caused by the extremely low observing window level (-700 HU), which is at the bottom of the bone intensity elevation. There is no apparent structural information in the difference image FIG. 11B except for a dark hint of the vessel in a area that is slightly above the center.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of processing measured signals, comprising the steps of:
   a) determining noise variance at each of the measured signals based upon a predetermined noise model;
   b) automatically generating a discrete kernel of a filter for each of the measured signals based upon a predetermined Pth power of the noise variance to be used as a frequency response of the filter at each of the measured signals; and
   c) applying the discrete kernel to a corresponding one of the measured signals to generate a filtered measured signal.

2. The method of processing measured signals according to claim 1 wherein the predetermined noise model is defined by $Var_{AL}=(Ve+WI)/I^2$ where the I is the measured signal while Ve and W are background noise and DAS gain tables determined for each detector bin.

3. The method of processing measured signals according to claim 2 wherein the discrete kernel of the filter for each of the measured signals is generated based upon the predetermined Pth power of the noise variance and by multiplying by a predetermined constant K to be used as the frequency response of the filter at each of the measured signals.

4. The method of processing measured signals according to claim 3 wherein the Pth power is determined based upon scale-space derivation including a linear diffusion equation.

5. The method of processing measured signals according to claim 3 wherein a value of the Pth power ranges from 0.2 to 1 while a value of the constant k ranges from 1 to 10000.

6. The method of processing measured signals according to claim 5 wherein a value of the Pth power is 0.5 while a value of the constant k is 1 each of the measured signals.

7. The method of processing measured signals according to claim 1 wherein the discrete kernel $I_{i_0}^G$ of the filter for a particular detector element (i) is defined by $$I_{i_0}^G = \frac{\sum_i I_i \exp\left(-\frac{\Delta x_i^2}{2V_{i_0}}\right)\exp\left(-\frac{(I_{i_0}-I_i)^2}{2V_R}\right)}{\sum_i \exp\left(-\frac{\Delta x_i^2}{2V_{i_0}}\right)\exp\left(-\frac{(I_{i_0}-I_i)^2}{2V_R}\right)}$$

where $\Delta x_i$ is the distance of a $i^{th}$ pixel in 1D to a predetermined reference pixel $i_0$ and $V_{i_0}$ is the frequency response of the filter at the reference pixel $i_0$, $V_R$ is a parameter of the filter.

8. The method of processing measured signals according to claim 7 wherein the parameter $V_R$ is equal to the after-log variance as determined by=$Var_{AL}=(Ve+WI)/I^2$, where the I is the measured signal while $V_e$ is a known electronic noise value.

9. The method of processing measured signals according to claim 1 wherein the discrete kernel $I_{(i_0,j_0)}^G$ of the filter for a particular detector element (i, j) is defined by $$I_{(i_0,j_0)}^G = \frac{\sum_{i,j} I_{i,j}\exp\left(-\frac{\Delta x_{i,j}^2}{2V_{i_0,j_0}}\right)\exp\left(-\frac{(I_{i_0,j_0}-I_{i,j})^2}{2V_R}\right)}{\sum_{i,j}\exp\left(-\frac{\Delta x_{i,j}^2}{2V_{i_0,j_0}}\right)\exp\left(-\frac{(I_{i_0,j_0}-I_{i,j})^2}{2V_R}\right)}$$

where $\Delta x_{i,j}$ is the distance of a ($i^{th}$, $j^{th}$) pixel in 2D to a predetermined reference pixel ($i_0$, $j_0$) and $Vi_0$ $j_0$ is the frequency response of the filter at the reference pixel ($i_0$, $j_0$), $V_R$ is a parameter of the filter.

10. The method of processing measured signals according to claim 9 wherein the parameter $V_R$ is equal to after-log variance as determined by $Var_{AL}=(Ve+WI)/I^2$, where the I is the measured signal while $V_e$ is a known electronic noise value.

11. The method of processing measured signals according to claim 1 further comprising an additional step of iterating said steps a), b) and c).

12. The method of processing measured signals according to claim 1 wherein the filter is a low pass noise-equalizing filter including a Gaussian filter.

13. The method of processing measured signals according to claim 1 wherein the filter generates the filtered measured signal by equalizing noise in the measured signals.

14. The method of processing measured signals according to claim 2 wherein the filter is a Gaussian filter and the variance of the Gaussian filter $V_G$ for each of the measured signals is generated based upon the predetermined VarPower of after-log noise variance $Var_{AL}$ and by multiplying by a predetermined constant VarScale to be used as the frequency response of the filter at each of the measured signals.

15. The method of processing measured signals according to claim 14 wherein the VarScale is defined by VarScale=1/$(4\pi)(1/Var_0)^{2/N}$, $Var_0$ being $(Ve_0+W_0I_0)/I_0^2$ where $Ve_0$ and $W_0$ are respectively a mean value of electronic noise variance and a detector gain, $I_0$ being acceptable noise count.

16. The method of processing measured signals according to claim 15 wherein the VarPower is defined 2/N, N being a number of dimension of the Gaussian filter.

17. A system for processing measured signals, comprising:
a noise reduction device for determining noise variance at each of the measured signals based upon a predetermined noise model, said noise reduction device automatically generating a discrete kernel of a filter for each of the measured signals based upon a predetermined Pth power of the noise variance to be used as a frequency response of the filter at each of the measured signals, said noise reduction device applying the discrete kernel to a corresponding one of the measured signals to generate a filtered measured signal; and
a reconstruction device connected to said noise reduction device for reconstructing images based upon projection data according to the filtered measured signal.

18. The system for processing measured signals according to claim 17 wherein the predetermined noise model is defined by $Var_{AL}=(Ve+WI)/I^2$, where the I is the measured signal while Ve and W are noise tables determined for each detector bin.

19. The system for processing measured signals according to claim 18 wherein the discrete kernel of the filter for each of the measured signals is generated based upon the predetermined Pth power of the noise variance and by multiplying by a predetermined constant K to be used as the frequency response of the filter at each of the measured signals.

20. The system for processing measured signals according to claim 19 wherein the Pth power is determined based upon scale-space derivation including a linear diffusion equation.

21. The system for processing measured signals according to claim 19 wherein a value of the Pth power ranges from 0.2 to 1 while a value of the constant k ranges from 1 to 10000.

22. The system for processing measured signals according to claim 21 wherein a value of the Pth power is 0.5 while a value of the constant k is 1 each of the measured signals.

23. The system for processing measured signals according to claim 17 wherein the discrete kernel $I_{i_0}^G$ of the filter for a particular detector element (i) is defined by $$I_{i_0}^G = \frac{\sum_i I_i \exp\left(-\frac{\Delta x_i^2}{2V_{i_0}}\right)\exp\left(-\frac{(I_{i_0}-I_i)^2}{2V_R}\right)}{\sum_i \exp\left(-\frac{\Delta x_i^2}{2V_{i_0}}\right)\exp\left(-\frac{(I_{i_0}-I_i)^2}{2V_R}\right)}$$

where $\Delta x_i$ is the distance of a $i^{th}$ pixel in 1D to a predetermined reference pixel $i_0$ and $V_{i_0}$ is the frequency response of the filter at the reference pixel $i_0$, $V_R$ is a parameter of the filter.

24. The system for processing measured signals according to claim 23 wherein the parameter $V_R$ is equal to after-log variance as determined by $Var_{AL}=(Ve+WI)/I^2$, where the I is the measured signal while $V_e$ is a known electronic noise value.

25. The system for processing measured signals according to claim 17 wherein the discrete kernel $I_{(i_0,j_0)}^G$ of the filter for a particular detector element (i, j) is defined by $$I_{(i_0,j_0)}^G = \frac{\sum_{i,j} I_{i,j} \exp\left(-\frac{\Delta x_{i,j}^2}{2V_{i_0,j_0}}\right) \exp\left(-\frac{(I_{i_0,j_0}-I_{i,j})^2}{2V_R}\right)}{\sum_{i,j} \exp\left(-\frac{\Delta x_{i,j}^2}{2V_{i_0,j_0}}\right) \exp\left(-\frac{(I_{i_0,j_0}-I_{i,j})^2}{2V_R}\right)}$$

where $\Delta x_{i,j}$ is the distance of a ($i^{th}$, $j^{th}$) pixel in 2D to a predetermined reference pixel ($i_0$, $j_0$) and $Vi_0$, $j_0$ is the frequency response of the filter at the reference pixel ($i_0$, $j_0$), $V_R$ is a parameter of the filter.

26. The system for processing measured signals according to claim 25 wherein the parameter $V_R$ is equal to after-log variance as determined by $Var_{AL}=(Ve+WI)/I^2$, where the I is the measured signal while $V_e$ is a known electronic noise value.

27. The system for processing measured signals according to claim 17 wherein the filter is a low pass noise-equalizing filter including a Gaussian filter.

28. The system for processing measured signals according to claim 17 wherein the filter generates the filtered measured signal by equalizing noise in the measured signals.

29. The system for processing measured signals according to claim 18 wherein the filter is a Gaussian filter and the noise variance of the Gaussian filter $V_G$ for each of the measured signals is generated based upon the predetermined VarPower of after-log noise variance $Var_{AL}$ and by multiplying by a predetermined constant VarScale to be used as the frequency response of the filter at each of the measured signals.

30. The system for processing measured signals according to claim 29 wherein the VarScale is defined by $VarScale=1/(4\pi)(1/Var_0)^{2/N}$, $Var_0$ being $(Ve_0+W_0I_0)/I_0^2$ where $Ve_0$ and $W_0$ are respectively a mean value of electronic noise variance and a detector gain, $I_0$ being acceptable noise count.

31. The system for processing measured signals according to claim 29 wherein the VarPower is defined 2/N, N being a number of dimension of the Gaussian filter.

* * * * *